US012433207B2

(12) United States Patent
Gallardo Pinto

(10) Patent No.: US 12,433,207 B2
(45) Date of Patent: Oct. 7, 2025

(54) ANTI-PEST DEVICE FOR FRUIT TREES AND THE LIKE

(71) Applicants: Bernardino Jiménez Sánchez, Madrid (ES); Ángel Gabriel Ramos Ramos, Madrid (ES)

(72) Inventor: Francisco José Gallardo Pinto, Madrid (ES)

(73) Assignees: Bernardino Jiménez Sánchez, Madrid (ES); Angel Gabriel Ramos Ramos, Madrid (ES)

( * ) Notice: Subject to any disclaimer, the term of this patent is extended or adjusted under 35 U.S.C. 154(b) by 15 days.

(21) Appl. No.: 18/014,656

(22) PCT Filed: Jun. 30, 2021

(86) PCT No.: PCT/ES2021/070479
§ 371 (c)(1),
(2) Date: Jan. 5, 2023

(87) PCT Pub. No.: WO2022/008773
PCT Pub. Date: Jan. 13, 2022

(65) Prior Publication Data
US 2023/0225262 A1    Jul. 20, 2023

(30) Foreign Application Priority Data
Jul. 6, 2020  (ES) .............. ES202000111

(51) Int. Cl.
*A01G 13/10*    (2006.01)
*A01M 1/22*    (2006.01)
*H05C 1/00*    (2006.01)

(52) U.S. Cl.
CPC .......... *A01G 13/105* (2013.01); *A01M 1/223* (2013.01); *H05C 1/00* (2013.01)

(58) Field of Classification Search
CPC ..... A01G 13/105; A01G 17/12; A01M 1/223; H05C 1/00
(Continued)

(56) References Cited

U.S. PATENT DOCUMENTS

| 44,667 | A | * | 10/1864 | Shepherd | ............. | A01G 13/105 47/32.5 |
| 2,240,766 | A | * | 5/1941 | Elder | ..................... | A01M 1/20 43/108 |

(Continued)

FOREIGN PATENT DOCUMENTS

| CN | 105493978 A | 4/2016 |
| CN | 109328828 A | 2/2019 |

(Continued)

*Primary Examiner* — Zoe Tam Tran
(74) *Attorney, Agent, or Firm* — Hayes Soloway P.C.

(57) ABSTRACT

An anti-pest device for fruit trees and the like that prevents trees from being affected by crawling insect pests includes a rectangular sheet of electrical insulating material, which can adopt the shape of an inverted truncated cone or a cylindrical configuration around the trunk of the tree; a band of low-density foam under the sheet that adapts to the physiognomy of the bark, and deforms with the growth of the trunk, whereas the sheet includes a sector that is superimposed thereon and slides on it to adapt to said growth; a pair of parallel conducting wires, separated a distance according to the size of the body of the insect to be exterminated, subjected to a high difference in electrical potential by means of a power supply circuit, such that when an insect tries to get past them, it is automatically electrocuted.

6 Claims, 3 Drawing Sheets

(58) Field of Classification Search
USPC .......................................................... 47/32.5
See application file for complete search history.

(56) References Cited

U.S. PATENT DOCUMENTS

| | | | |
|---|---|---|---|
| 4,471,561 A | | 9/1984 | Lapierre |
| 5,035,078 A | * | 7/1991 | Kipnees ............. A01G 13/0237 47/29.1 |
| 5,142,817 A | * | 9/1992 | Rolf ................... A01G 13/0237 47/32.5 |
| 5,325,624 A | * | 7/1994 | Richardson ............. A01M 1/24 43/112 |
| 6,195,932 B1 | * | 3/2001 | Aicher .................... A01M 1/04 43/112 |
| 6,226,933 B1 | * | 5/2001 | Nelson .................... E04H 12/20 43/124 |
| 9,890,536 B2 | * | 2/2018 | Lolio, Jr. ............. E04D 13/0645 |
| 2006/0143974 A1 | | 7/2006 | Pollmann |
| 2009/0235581 A1 | * | 9/2009 | Bevins ................... A01G 13/00 47/32.5 |
| 2013/0058000 A1 | * | 3/2013 | Kaps ........................ H05C 1/00 361/232 |

FOREIGN PATENT DOCUMENTS

| | | |
|---|---|---|
| CN | 110050770 A | 7/2019 |
| DE | 102016002094 A1 | 8/2017 |
| FR | 2576748 A1 | 8/1986 |
| GB | 2446560 A | 8/2008 |

* cited by examiner

ANTI-PEST DEVICE FOR FRUIT TREES AND THE LIKE

CROSS-REFERENCE TO RELATED APPLICATIONS AND PRIORITY

This patent application claims priority from PCT Application No. PCT/ES2021/070479 filed Jun. 30, 2021, which claims priority from Spanish Patent Application No. P202000111 filed Jul. 6, 2020. Each of these patent applications are herein incorporated by reference in their entirety.

OBJECT OF THE INVENTION

The present invention relates to a device that has been specially designed to be implemented on all types of trees and woody plants, such as fruit trees, ornamental trees, without ruling out any other type of trees, in order to prevent them from being affected by crawling insect pests.

The object of the invention is to provide a device that, in addition to establishing a physical barrier for insects that try to access the tree canopy by means of the trunk thereof, includes means for their extermination in a completely ecological way, without affecting the normal growth of said tree, and without significantly reducing the insectivore population. Furthermore, the device adapts fully and automatically to the growth of the plant, and consequently of the trunk, without damaging it and without having to be manipulated for the adaptation thereof.

The invention preferably falls within the field of agriculture, without ruling out the protection of any type of tree that can be infested by crawling insects.

BACKGROUND OF THE INVENTION

In the field of practical application of the invention, the symbiotic relationship between ants and aphids is known, such that aphids excrete a sticky substance (honeydew) which the ants feed on, at the same time that they protect the aphids from their predators, for example, ladybirds.

Unfortunately for the host plant, honeydew stimulates mould growth. Aphids also suck sap from plants, slowing their growth. Some aphids can transmit a virus that can have a devastating impact on crops.

To try to overcome this problem, in the case of fruit trees, pesticide products are applied to their leaves and branches which, despite satisfactorily fulfilling the function for which they were intended, exhibit multiple and varied problems, wherein the following aspects are worth mentioning:

These products are potentially toxic for humans and can cause harmful effects on health, such as cancer, as well as affect the reproductive, immune and nervous systems.

These products are difficult to degrade, so they pose a problem from an environmental point of view.

A large volume of product must be applied for it to be effective against pests, which in large fruit tree orchards represents a very significant economic cost.

To try to overcome this problem, and with regard to preventing the access of crawling insects towards the tree canopy, some solutions are known by way of physical barriers on tree trunks, such as whitewashing, which negatively affects the pH of the soil in the presence of rains, as well as the implementation of annular barriers where, despite hindering the access of ants or insects towards the upper area of the tree, said physical barriers are in no way insurmountable by said insects. Moreover, they prevent the growth of the trunk in the area of application, which causes malformations in the trunk that negatively affect the growth of the tree and consequently the productivity thereof.

Document U.S. Pat. No. 4,471,561A describes an insect exterminating device comprising a flat base sheet of electrical insulating material intended to completely surround a structure on which the insects to be exterminated travel, having a low voltage direct current battery, a pulse circuit connected to the battery to produce low voltage pulses, a transformer circuit connected to said pulse circuit to convert said low voltage pulses into high voltage pulses, and a pair of elongated electrical contacts connected to said transformer circuit that extend along the entire length of the sheet, such that the contacts are separated from each other so that the electrical circuit remains open, and is closed by the very insect that tries to cross the base sheet.

The problem with this device is that it does not adapt correctly to trunks in which the bark exhibits large reliefs and irregularities, since it is a simple sheet of insulating material which cannot in any way fit tightly to the contour of the tree when said tree exhibits a very irregular relief, as happens in a great variety of trees or woody plants.

This means that passages are formed for the insects between the irregularities or projections and recesses of the bark so that they can avoid the barrier formed by the sheet of insulating material.

In parallel, document FR2576748 discloses a system comprising a rectangular sheet of electrical insulating material assisted by a band of foam to adapt to the geometry of the trunk, a sheet in which parallel and zigzag conducting wires connected to a battery are established.

The problem exhibited by document FR2576748, like document U.S. Pat. No. 4,471,561A, is that these devices do not adapt to the growth of the tree, so they must be periodically manipulated in order to prevent the trunk of the tree from being strangled during the growth thereof.

This problem is intensified when the device is implemented in orchards with hundreds of trees, wherein it is necessary to individually readjust all the devices associated with each one of the trees, which entails a significant waste of time.

Finally, another problem exhibited by other devices of this type on the market is associated with the logistics of storage and distribution, since when it comes to orchards with a large number of trees, the volumetric occupation of each device matters, so that many of these devices are not able to be stacked or stored by adopting a flattened laminar arrangement, with the consequent space limitations that this may entail.

DESCRIPTION OF THE INVENTION

The anti-pest device contemplated herein provides a completely satisfactory solution to the problem set out above, based on a simple but effective solution, preventing access and exterminating any crawling insect that tries to climb the trunk or branch of the tree on which it is implemented, all in an ecological and economic way and adapting to the growth of said trunk.

For this, and more specifically, the device of the invention is made from a rectangular sheet of electrical insulating material, such as an acetate sheet, the upper edge of which includes on the inner face thereof a strip of flexible foam, which adapts to the physiognomy of the bark of the trunk to which the device is applied, a sheet that is wound around said trunk such that it adopts a conical configuration so that said sheet is finished with an elastic tape in correspondence with one of the upper ends thereof, which enables the upper edge of the acetate sheet to be externally wrapped against the trunk itself, forming a kind of cone, tying the tape on itself, and thus preventing the passage of insects through the inner portion thereof.

In this way, by forming a conical surface by means of the inclined superposition of the two side edges of the sheet, the assembly can be deformed and extended adapting to the growth of the tree, contrary to what would happen with a sheet the development of which generates a perfect cone, wherein an increasing opening would be defined in correspondence with one of its generatrixes, which is prevented by the rectangular shape of the sheet.

In any case, and in accordance with the essence of the invention, a circuit is fixed on the diagonal of the internal face of the non-conducting sheet, based on pairs of parallel conducting wires, for example copper wires, arranged with a small separation between them, according to the size of the body of the insect to be exterminated, such that these conducting wires are arranged in an open circuit and they are subjected to a high difference in electrical potential through a small, properly isolated circuit arranged in correspondence with the upper end of the assembly, so that said circuit establishes enough voltage to electrocute the crawling insect in question, which will close the electrical circuit with its own body.

The circuit will work both day and night, for which it will incorporate a battery that can be recharged through a photovoltaic solar panel, which can be fixed to a tree branch through a telescopic arm with the corresponding clamp or fixing means thereof.

From this structuring, the operation is as follows:

The device defines an essentially frustoconical barrier that causes the insects ascending from the ground along the tree trunk to first encounter the foam-based edge or barrier that surrounds the tree trunk in correspondence with the upper end of the sheet arranged in the shape of a cone, which forces them to continue downwards along the internal face of said non-conducting sheet.

The arrangement of the pairs of wires on the diagonal of the sheet, together with the conical shape that said sheet is forced to adopt, causes the insects to always encounter a pair of parallel conducting wires when they move so that in order to continue advancing towards the upper portion of the tree they have to cross it transversely, at which time the insect will rest on both conducting wires, closing the electrical circuit and therefore acting as a fuse, dying instantly as they are electrocuted and falling by gravity, leaving the circuit open again and waiting for another insect to try to cross through the barrier defined by the pairs of conducting wires.

As the conducting wires are arranged on the internal face of the non-conducting sheet, and said sheet is insulated by means of foam on the inside and rubber on the outside, the circuit will be properly isolated from the rain, ensuring the operation thereof under any weather conditions, both day and night, adapting to the growth of the trunk of the tree on which it is implemented.

The device thus described is completely ecological, unlike the pesticides commonly used for the same purpose, much more economical not only in the long term but in the medium term, resistant, durable and completely autonomous.

According to a variant embodiment of the invention, it has been envisaged that the device can be structurally simplified in order to exhibit a lower volumetric occupation and greater structural simplicity that causes its economic viability to be increased even more, such that starting from the same basic structuring, wherein a sheet of electrical insulating material participates, said sheet will take the form of an elongated rectangular sheet, which will be complemented by a band of low-density foam established under the same, capable of being inserted and faithfully adapted to the reliefs of the bark, establishing an insurmountable barrier for insects, a sheet that is wound around said trunk such that it adopts a cylindrical configuration, with the particularity that said sheet exhibits a length greater than the circumference of the tree trunk to which it is applied, a section of the same corresponding to the distal end thereof being superimposed on the other end.

In this way, the free distal end is linked to the area of superposition with the sheet through elastically deformable elements, such as a pair of springs, elastic rubbers or the like, which enable said free end to slide with respect to the wrapping of the sheet so that it can increase the diameter thereof without breaking the electrical barrier that is created with it at any time.

To do this, and in a similar but simpler way to the first variant embodiment, longitudinally to the insulating sheet, a circuit will be established from end to end based on pairs of parallel conducting wires, for example copper wires, arranged with a small separation between them, according to the size of the body of the insect to be exterminated, such that these conducting wires are arranged in an open circuit and they are subjected to a high difference in electrical potential through the aforementioned pulse generator circuit.

These electrical pulses will be programmed to be preferably emitted with a frequency of 1.5 seconds.

Consequently, the device will fully and automatically adapt to the growth of the tree trunk without breaking the electrical barrier defined by the conducting wires thereof at any time, or at least for a considerable period of time until both ends of the sheet coincide with each other.

Finally, all that remains to be pointed out is that by means of the device of the invention it has been possible to verify how the implementation of the same affects the habits of the insects in the area, achieving the following effects:

Crawling insects stop trying to climb up the tree trunk.

The absence of ants on the trunk means that aphids are not attracted to the plant.

Increase in natural predators in the area for insects of this type.

DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

Finally.

PREFERRED EMBODIMENT OF THE INVENTION

In view of FIGS. 1 to 5, it can be seen how the device of the invention comprises a rectangular sheet (1) of electrical insulating material, such as, for example, a transparent acetate sheet.

Said acetate sheet (1) comprises on, what will be its upper, internal edge of application on a tree trunk (2) to which it is applied, a band (3) of foam or equivalent deformable material, which enables it to adapt to the contour of the bark of the tree trunk (2), sealing the same and thereby preventing the passage of insects therethrough.

Figure 2:
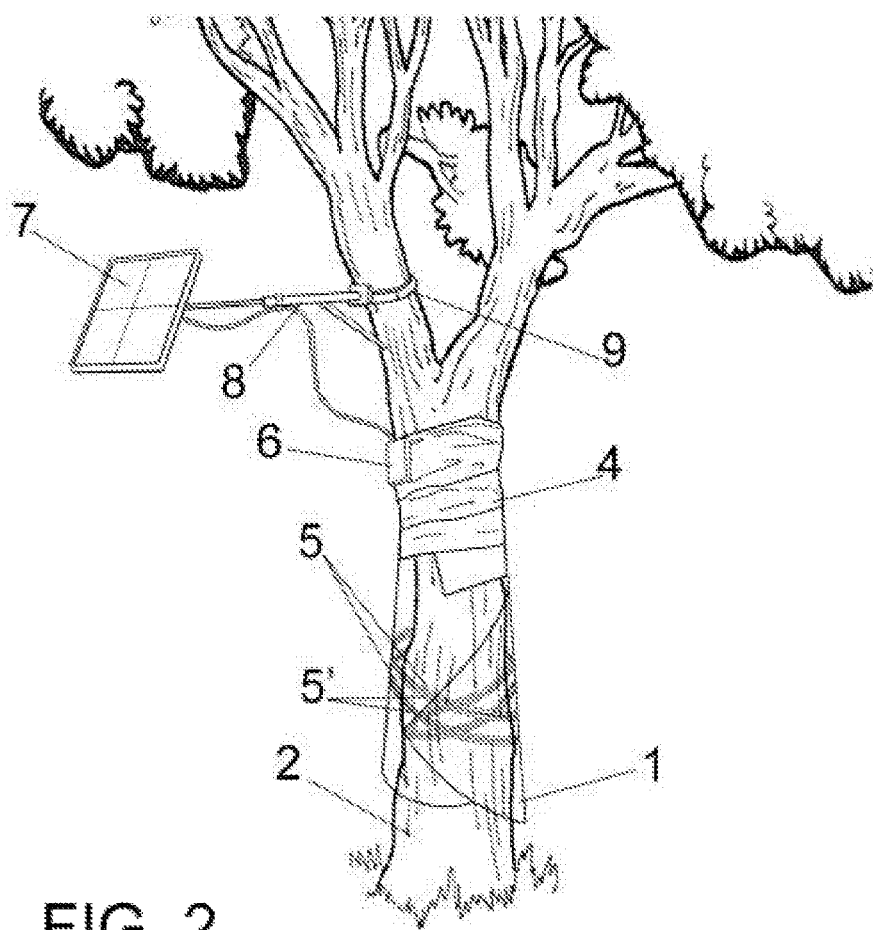
FIG. 2 shows a perspective view of the device of the invention properly implemented on the corresponding fruit tree.

The sheet will be wound around the tree trunk (2) as shown in FIG. 2, superimposing the side ends thereof at an angle to form a kind of deformable cone, able to be adapted to the tree trunk during its growth, and which is fixed to said trunk by means of an elastic rubber band (4) that will be fixed to one of the upper vertices of the sheet (1) that is externally wound around the upper edge of said sheet and is tied on itself.

Returning again to FIG. 1, in an arrangement diagonal to the sheet (1), and on the internal face thereof, pairs of parallel conducting wires (5-5') will be arranged with a small separation between them, according to the size of the body of the insect to be exterminated, in this case two pairs, based on copper sheets, electrically connected in parallel, and which are connected to a voltage supply circuit (6) by means of cables or conductors, establishing between each pair of conducting wires (5-5') a potential difference of 100 volts.

Thus, the conducting wires (5-5') will be in an open circuit under normal conditions, until an insect tries to cross them, at which time the very insect will close the circuit causing its electrocution. FIG. 2 shows how the pairs of conducting wires (5-5') adopt an arrangement on the sheet (1) that prevent insects from accessing the lower edge of the sheet to hypothetically go over it and come up the upper face thereof. As such, said FIG. 2 shows how said conducting wires (5-5') intersect forming closed rings around the conical surface, which do not close the circuit electrically because the very sheet (1) of electrical insulating material is interposed between them.

The power supply circuit (6) will be properly integrated into a watertight casing, having an internal battery that enables the device to operate both day and night, battery that can be recharged through a photovoltaic solar panel (7), which can be fixed to a tree branch by means of a telescopic arm (8) with the corresponding clamp (9) or fixing means thereof.

The power supply circuit of the system enables up to 300 devices to be connected in respective trees or branches, by means of a wired connection system therebetween through watertight connectors.

Likewise, the device may have radio communication means to remotely monitor the operating parameters thereof.

Figure 3:
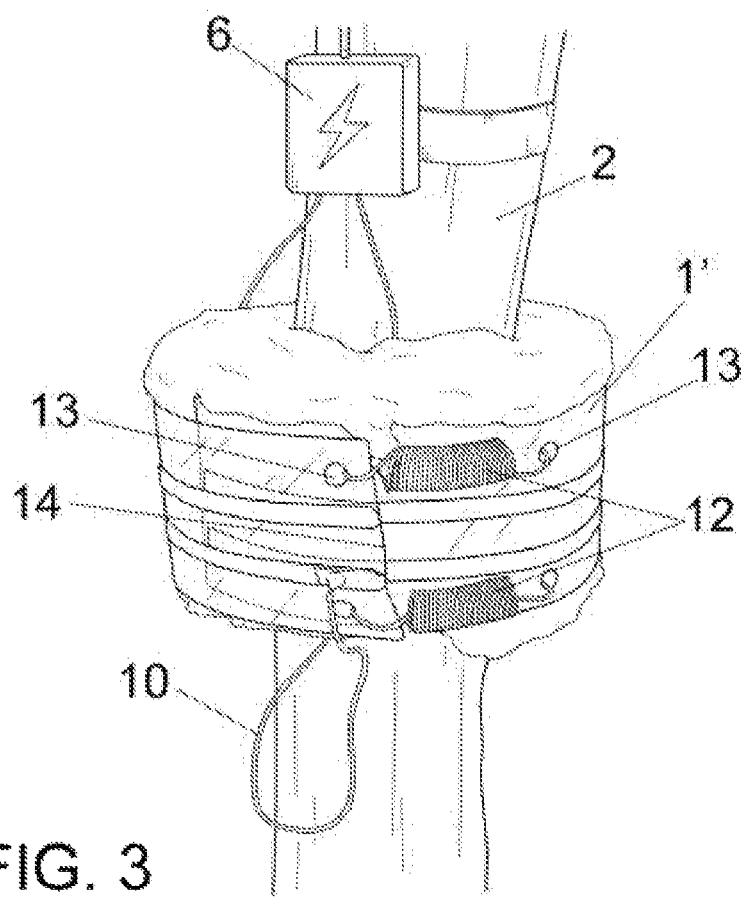
FIG. 3 shows a perspective view of a simpler variant embodiment provided for the device of the invention, applied to the corresponding tree trunk.
Figure 4:
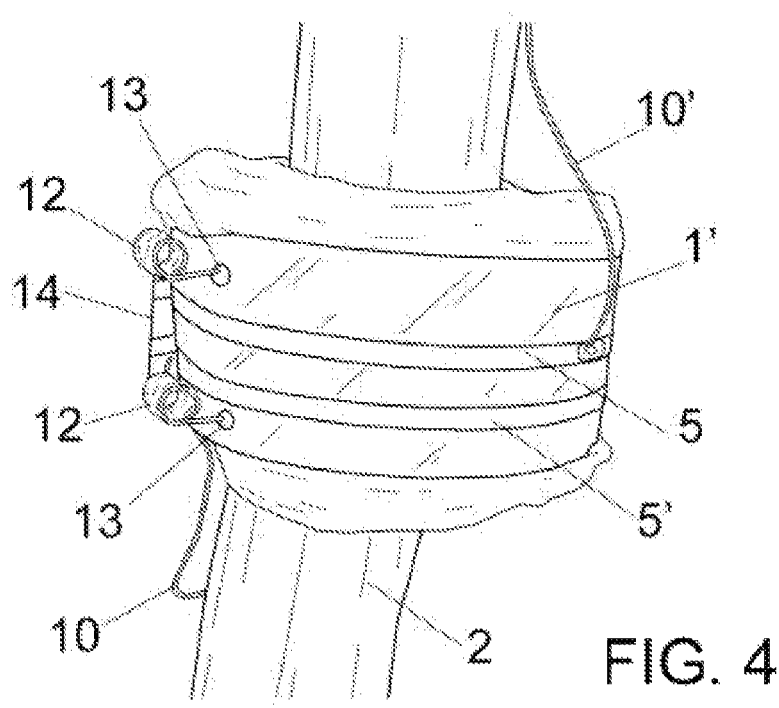
FIG. 4 shows a rear perspective view of the assembly of FIG. 3.
Figure 5:
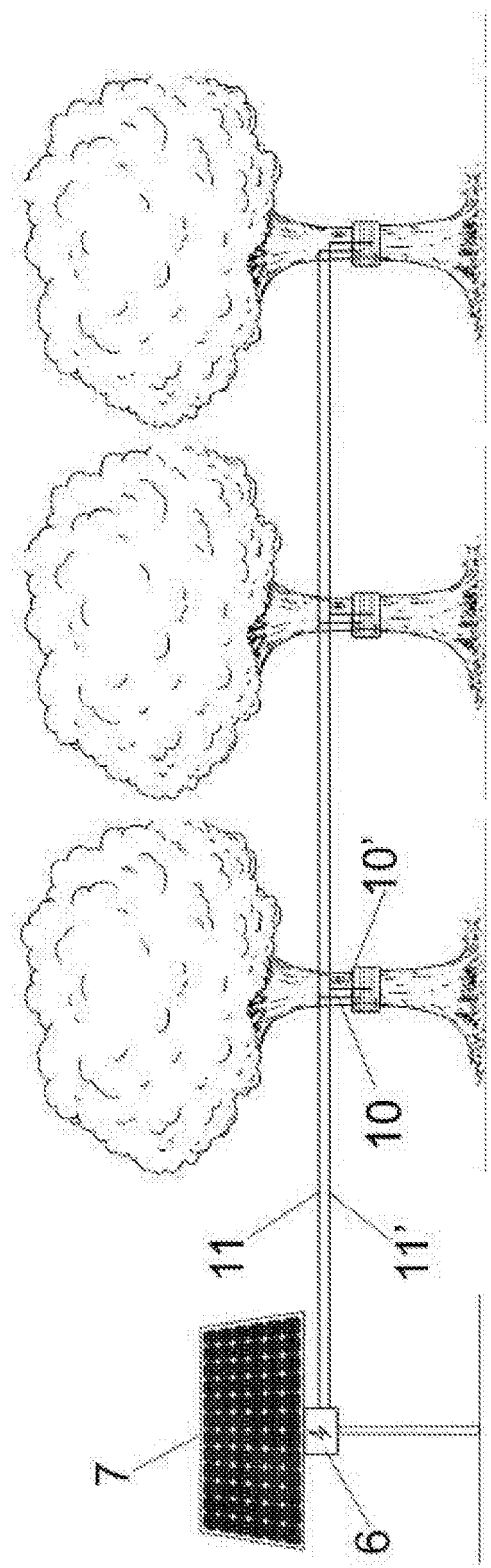
FIG. 5 shows a schematic view of the variant embodiment of FIGS. 2 and 3 applied to a multi-tree orchard.

According to the variant embodiment of FIGS. 3 to 5, it has been envisaged that the sheet (1'), for example obtained in acetate, optionally exhibits an elongated rectangular configuration, under which a band (3) of low-density foam is established, arranged around the tree trunk, a band of foam that due to the low density thereof can be inserted and faithfully adapted to the reliefs of the bark, as well as be elastically deformed during the growth of the trunk itself, a band on which the sheet (1') is arranged adopting a cylindrical arrangement, and which exhibits a length greater than the circumference of the trunk/band (3) of foam assembly of the tree to which it is applied. A section of the same corresponds to the free distal end (14) thereof being superimposed on the sheet itself, such that said free distal end (14) is linked to the area of superposition with the sheet through elastically deformable elements (12), which in the practical exemplary embodiment take the form of springs, which are linked at the ends thereof to orifices (13) made on the sheet, but which could also take the form of elastic rubbers or any other elastically deformable element that enables said free distal end (14) to slide on the main body of the sheet, thus adapting to the progressive growth of the tree trunk.

On the external face of the sheet (1'), a circuit is arranged based on pairs of parallel conducting wires (5-5'), for example, copper wires, arranged with a small separation between them, according to the size of the body of the insect to be exterminated, and which extend longitudinally to the sheet (1') from end to end thereof.

Figure 1:
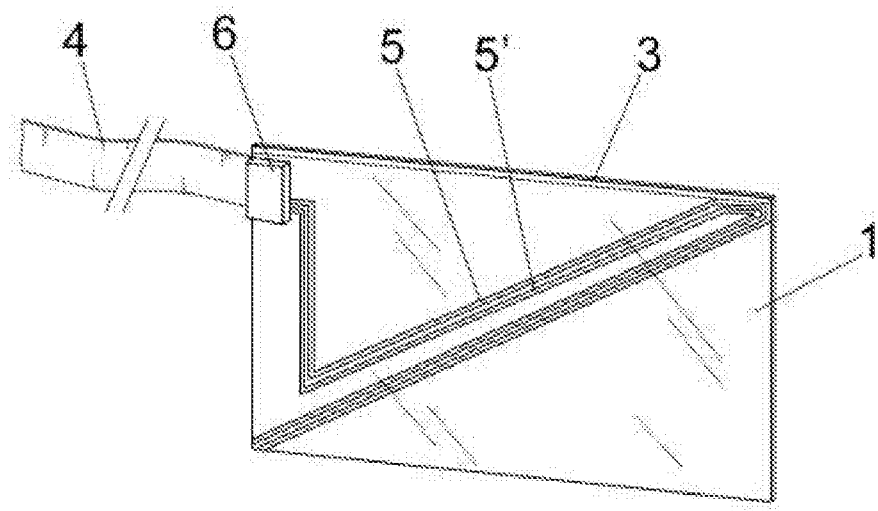
FIG. 1 shows a plan view of the development of the sheet that participates in an anti-pest device for fruit trees and the like embodied in accordance with the object of the present invention.

Like in the case of the variant embodiment of FIGS. 1 and 2, these conducting wires are arranged in an open circuit and are connected to a voltage supply circuit (6) by means of respective cables or conductors (10-10').

These electrical pulses will be programmed to be emitted with a frequency of 1.5 seconds, with a power of 13.5 millijoules/s.

This power supply circuit (6) will be properly integrated into a watertight casing, having an internal battery that enables the device to operate both day and night, battery that can be recharged through a photovoltaic solar panel (7).

As can be seen in FIG. 5, the circuit (6) will be able to supply power to multiple devices connected in parallel through the corresponding wiring (11-11'), by means of watertight connectors.

As in the previous case, the installation may include radio communication means to remotely monitor the operating parameters thereof.

From this structuring, and as previously mentioned, the conducting wires will draw respective circles parallel to each other and concentric to the tree trunk, the length (circumference) of which will fully and automatically adapt to the increasing diameter of the tree trunk, defining the only possible passage for insects, which will be electrocuted by the electrical arc generated by the very insect when it is in the space comprised between said conductors. As such, it is not even necessary for the insect to simultaneously touch both conducting wires.

In this way, a means is achieved that prevents the access of any insect approaching the tree from the ground, whether they are ants, spiders, aphids, etc.

The invention claimed is:

1. A device against pests in fruit trees with a trunk with bark, wherein the device comprises:
   an elongated rectangular sheet of electrical insulating material, defined by a length and comprising a distal end and a proximal end and an internal face and an external face,
   a band of low-density foam, defined by a length, attached to the internal face of the elongated rectangular sheet, wherein the band of low-density foam is any foam adaptable to the bark of a tree and capable of being inserted and faithfully adapted to the reliefs of the bark,
   wherein the elongated rectangular sheet has a greater length than the band of low-density foam in such a way that when the band of low-density foam surrounds the bark of the tree trunk, the distal end of the elongated rectangular sheet is superimposed on the proximal end of the elongated rectangular sheet, and wherein the device additionally comprises:
- elastically deformable elements, that link the distal end of the elongated rectangular sheet to the proximal end that enables said free distal end to slide on the main body of the sheet, thus adapting to the progressive growth of the tree trunk,
- a pair of parallel conducting wires arranged in an open circuit and placed on the external face of the elongated rectangular sheet, separated from each other a distance according to the size of a pest to be exterminated, and
- a power supply circuit, connected to the pair of parallel conducting wires, for subjecting them to a high difference in electrical potential.

2. The device of claim 1, wherein the power supply circuit comprises an internal battery, which can be recharged through a photovoltaic solar panel.

3. The device of claim 1, wherein the elongated rectangular sheet is made of acetate.

4. The device of claim 1, wherein the power supply circuit comprises electrical pulses emitted with a frequency of 1.5 seconds, and a power of at least 13.5 millijoules/s.

5. The device of claim 1, wherein the device further comprises a radio communication system for remotely monitoring, connected to the power supply circuit.

6. The device of claim 1, wherein the device further comprises a wired connection through watertight connectors connected to the power supply circuit and connectable to other devices of the same type.

* * * * *